July 4, 1961 R. R. AUDETTE 2,990,906
ACOUSTIC ABSORBER
Filed Oct. 8, 1958
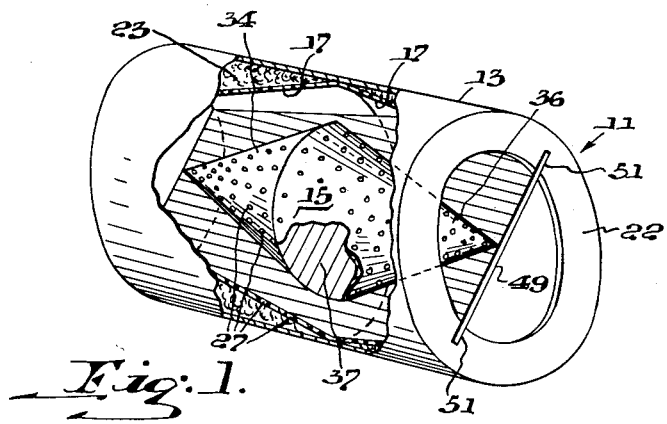
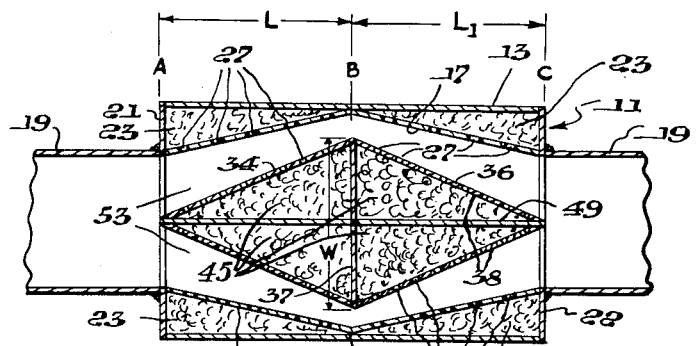
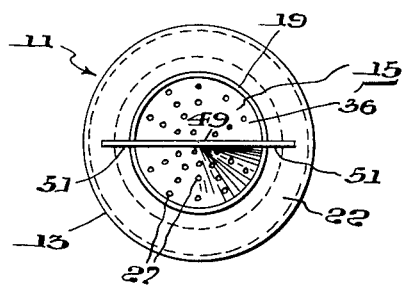
INVENTOR.
RICHARD R. AUDETTE.
BY
Oscar B. Brumback.
his ATTORNEY.

United States Patent Office 2,990,906
Patented July 4, 1961

2,990,906
ACOUSTIC ABSORBER
Richard R. Audette, Annapolis, Md., assignor to Koppers Company, Inc., a corporation of Delaware
Filed Oct. 8, 1958, Ser. No. 766,066
2 Claims. (Cl. 181—50)

This invention relates generally to the attenuation of acoustic energy and, more particularly, to apparatus and process for attenuating the sound accompanying the flow of a fluid medium within a confined space.

When a fluid medium flows through a confined space, as for example, where air passes through ducts at high velocities in air conditioning systems, the fluid medium carries with it audible noise sounds produced by the operation of engines and fans connected with the systems and in addition produces audible sounds itself because of the high velocity with which fluid medium flows in the confined space or ducts. The elimination or marked reduction of the intensity of the sound energy accompanying the flow of such fluid medium is frequently desirable.

Acoustic absorbers such as are disclosed in U.S. Patent 2,759,554 have been known heretofore for attenuating sound accompanying the flow of a fluid in a confined space. However, such apparatus is designed for rectangular shaped ducts, and the practice in the air conditioning industry now is to use circular ducts where high pressure and high velocity flows of gas are necessary. The apparatus as heretofore known has not, from the standpoint of economics or performance, been efficient for use with circular ducts. The heretofore known apparatus has required transition ducts from the circular upstream supply duct to the rectangular absorber and from the rectangular absorber to the downstream discharge circular duct. Such transition ducts are expensive in construction and are inefficient in performance because turbulence and pressure losses result therein. Rectangular absorbers such as used heretofore result in high pressure losses from a point adjacent the upstream side of the absorber to a point adjacent the downstream side of the absorber probably because the substantially rectangular shape of the fluid passageway, no matter how efficient acoustically, is not efficient aerodynamically.

This invention contemplates an apparatus and method for attenuating over a wide range of frequencies the acoustic energy accompanying the flow of a fluid medium in a circular duct while maintaining aerodynamic energy losses therein at a low value, the apparatus including a cylindrical shaped housing whose ends are adapted to be attached to the duct for the flow of medium and a streamlined body which is supported therein for blocking the line of sight between the end openings, the cylinder having on its inner side a lining conformed to the shape of the streamlined body but spaced therefrom a distance such that the cross sectional area of the space between the body and lining is equivalent to the cross sectional area of the duct, the body and lining both having sound attenuating characteristics whereby acoustical energy of these frequencies which tend to travel by line of sight is blocked by the body and acoustical energy of other frequencies is attenuated by the body and the lining.

The above and further novel features of the invention will appear more fully from the following detailed description when the same is read in connection with the accompanying drawings. It is to be expressly understood, however, that the drawings are not intended as a definition of the invention but are for the purpose of illustration only.

FIG. 1 is an isometric and partial cutaway view of the novel sound absorber of this invention.

FIG. 2 is an elevation and partial cross section of the apparatus of this invention.

FIG. 3 is an end view of FIG. 2.

Referring to FIG. 1, an embodiment of this invention designated generally as absorber 11 is particularly adapted for use with air conditioning systems where attenuation of a wide range band of sound frequencies and low pressure drops are desirable. Considering absorber 11 in a general fashion, the outer shell 13 of absorber 11 houses a sound attenuating body 15 whose shape is streamlined so as to cause low air pneumatic losses and on the inner wall of shell 13 is a liner 17 which cooperates with body 15 to attenuate sound and to provide a channel having the same cross sectional area as that of supply duct 19 so as to neither constrict nor expand the fluid stream.

Considering now the details of absorber 11, shell 13 is an imperforate cylinder which terminates at both ends in imperforate annular rings 21 and 22 having inner diameters sized for the circular duct work 19 which carries air or other such media. End rings 21 attach to duct work 19 by suitable means well known in the art, such as by welding or the like. Shell 13 and end rings 21 are made of conventional materials having good values of sound transmission loss, typical materials being sheet steel and sheet aluminum.

The inner side of the shell 13 is lined with an acoustically absorbent material 23. In accordance with this invention, this acoustically absorbent material is advantageously in the form of glass fibers but other materials such as packed felt, rock wool and the like may be used.

To position the acoustically absorbent material 23, a liner 17 having an acoustically transparent wall is provided. This wall may be constituted of perforated metal, the perforations 27 of which are more clearly shown in FIG. 2. Other types of acoustically transparent material such as wire mesh and the like may also be used, although perforated metal is preferred because of its structural rigidity. Liner 17 is advantageously formed from two perforated members each being substantially of the shape of a hollow right frustum of a right circular cone. The larger annular termini (circular edge or rim) of the members have substantially equal radii to facilitate abutting or connecting these members along these circular edges of equal radii in a plane perpendicular to the longitudinal axis of shell 13 to produce liner 17. This plane passes through mid point 31 of the embodiment shown herein of the absorber 11.

Within shell 13 is supported the center body 15. This center body 15 is substantially formed in the shape of two cones 34 and 36, joined at a common base 37. The walls 38 of the cones are of acoustically transparent material such as perforated metal with holes 27 whereas the base is acoustically opaque and is made of solid sheet material such as steel, having good values of sound transmission loss.

This center body 15 has an acoustically transparent filling 45 inside its outside wall 38 which includes glass fibers, packed felt, rock wool and the like. In accordance with this invention, this acoustically absorbent material is in the form of glass fibers.

The support for body 15 may be a solid plate 49. Advantageously the edges of plate 49 may be inserted into slots 51 (FIG. 3) in rings 21 and 22 and welded therein to support the center body 15.

The cooperation of outside wall 38 of body 15 in relation to the wall 17 forms an annular passageway 53 having a uniform cross sectional area along its length. The cross sectional area of passageway 53 is determined in accordance with the cross sectional area of the conduit from which the air is supplied. This passageway 53 is formed with a constant cross sectional area in accordance with this invention so as to provide low aerodynamic losses. Thus, by using substantially cone and conical frustum sections as described, an annular streamlined passageway is provided for the flow of air which is more efficient aerodynamically than any other acoustical absorber of comparable acoustical attenuations which has been known heretofore.

In accordance with this invention, the base 37 of body 15 is made larger in diameter than the inner diameter of the end ring 21. Thus there is no line of sight possible from one end to the other in the absorber of this invention. Since the higher audio frequencies of the noise sounds tend to travel in a line of sight fashion, these frequencies are blocked by the base 37 and absorbed by the sound absorbing material in body 15. Some of the higher frequency noise sounds coming through the duct 19 tend to be deflected in the absorber, for example, by the change in direction of the flow of air through the absorber, but these are thus blocked by the outer shell 13 and absorbed by the adjacent sound absorbing materials 23 and 45. Accordingly, the invention provides for the attenuation of these higher audio frequencies.

In the case of the lower intermediate frequencies, those frequencies of from about 100 to 300 cycles per second, some are partially absorbed by the acoustically absorbent materials 23 and 45, thereby attenuating their energy. Further attenuation is accomplished by proper adjustment of the longitudinal separations L and L₁ between the stations of end rings 21 and 22 and the station of base 37. The position of the end rings 21 and 22 with respect to the base 37 determine the direction changing stations A, B, and C for the air from duct 19; and by arranging these stations at locations so that the distance L and L₁ correspond substantially to the half wave length of the intermediate sound frequencies, further attenuation mentioned is achieved by means of reactive impedance. To illustrate this it has been shown that at stations A and B, for example, constrictions to the sound energy traveling in the absorber becomes reduced between base 37 and shell 13. Such constrictions present an increase in impedance to the flow of the normal sound energy. When such impedance occurs at an interval that corresponds substantially to the half wave length of particular frequency of sound energy, or multiples thereof, an overall impedance to the flow of that sound energy is produced at such interval. Thus, further attenuation of such sound energy is accomplished.

Still a further control over the degree of attenuation of intermediate frequencies is provided by this invention. The axial dimension or width W of base 37 may be made to correspond to the half wave length of the intermediate frequencies, thus providing for resonance absorption axially by the sound absorbing materials 23 and 45. This additional attenuation results from the fact, for example, that at the axial half wave length resonant dimension W the sound absorbing material 23 presents a low impedance looking axially inwardly from the outer circumference of base 37 comparable with the longitudinal impedance presented by the location of points A and B separated a distance corresponding to the half wave length of the intermediate frequencies. The sound energy, therefore, divides with an appreciable part thereof traveling axially into the sound absorbing material 23 adjacent the base 37, which part, because of the low impedance presented axially inward by the resonant dimension W, divides adjacent base 37 and travels axially into the sound absorbing material 23 to dissipate itself therein.

The density of the sound absorbing materials 23 and 45, although advantageously of uniform density, may be varied to vary the attenuation of different frequencies. For example, with the material of uniform density the attenuation of the low frequencies is somewhat less and the attenuation of the high frequencies somewhat greater.

To reduce the high frequency attenuation and increase the low frequency attenuation while maintaining the attenuation of the intermediate substantially constant, the density of the sound absorbing materials may be varied so that the least dense material is adjacent the perforated wall 38, the most dense material is adjacent the intersection of base 37 and plate 49, and an intermediate density part interposed therebetween. On the contrary, to increase the low frequency attenuation and to increase the high frequency attenuation as well, a configuration may be utilized having intermediate sections of less density than similar outer and inner sections.

The foregoing has described a method and apparatus for attenuating a wide band of sound frequencies which is particularly adapted for fluid flowing in a duct with a circular cross section. Moreover the apparatus and method of this invention is more efficient aerodynamically than methods or apparatus known heretofore in that it provides an annular passageway of uniform cross section along its length and for the deflection of the stream toward and away from the longitudinal axis of the apparatus without substantial pressure drop.

What is claimed is:

1. Apparatus for attenuating the acoustic energy accompanying the flow of a fluid medium in a cylindrical duct comprising an imperforate substantially cylindrical enclosure adapted to be connected to said cylindrical duct for the flow of said medium therethrough, a perforate lining for said enclosure comprising two members each being substantially of the shape of a hollow right frustum of a right circular cone with the circumference of the major terminal cross-section of said members being substantially equal, said members being located within said enclosure with said major terminal cross-sections abutting in a plane at right angles to the longitudinal axis of said enclosure, a substantially streamlined center body supported in said enclosure and formed by connecting two hollow members each being substantially of the shape of a right circular cone having perforate sides and a common imperforate base with a low value of sound transmission loss, said center body being so located relative to said lining that an annular passageway of uniform cross sectional area is provided through said enclosure along the length of said center body and acoustically absorbent material disposed both within said center body and in the space between said lining and said enclosure.

2. Apparatus for attenuating the acoustic energy accompanying the flow of a fluid medium in substantially cylindrical ducts and for connecting with said ducts for the flow of said fluid medium therethrough comprising an imperforate substantially cylindrical enclosure whose inside diameter is greater than the inside diameter of said ducts, said enclosure having imperforate annular end plates whose inner diameters are adapted to connect with the ends of said ducts, said enclosure also having a perforate inner wall which converges toward the inside diameter of said enclosure from the inside diameter of said end plates and meets in a plane which is perpendicular to the axis of said enclosure and is central of the said enclosure, a substantially streamlined body in the shape of two substantially cone shaped members having a common imperforate base and corporate sides, the plane of said base and said plane of intersection of said perforate inside wall of said enclosure coinciding, said body and said perforate side walls forming an annular passageway of uniform cross sectional area which first directs the flow of fluid away from the axis of said enclosures and then directs the flow back to the axis of said enclosure, whereby the acoustical energy which tends to travel by line of sight is attenuated and whereby the acoustical energy which does not tend to travel by line of sight is attenuated in said body and side walls.

References Cited in the file of this patent

UNITED STATES PATENTS

| | | |
|---|---|---|
| 1,575,657 | Straussler | Mar. 9, 1926 |
| 2,575,233 | Plasse | Nov. 13, 1951 |
| 2,613,758 | Cullum | Oct. 14, 1952 |
| 2,759,554 | Baruch | Aug. 21, 1956 |
| 2,869,671 | Schlachter et al. | Jan. 20, 1959 |